United States Patent [19]
Gragnolati et al.

[11] Patent Number: 4,839,872
[45] Date of Patent: Jun. 13, 1989

[54] GEOPHONE WITH A SENSITIVE ELEMENT MADE OF PIEZOELECTRIC POLYMER

[75] Inventors: Claude Gragnolati, Cannes; Didier Thollon, Juan les Pins; Jean-Georges Malcor, Biot, all of France

[73] Assignee: Thomson-CSF, Paris, France

[21] Appl. No.: 195,869

[22] Filed: May 19, 1988

[30] Foreign Application Priority Data

May 19, 1987 [FR] France ............... 87 06990

[51] Int. Cl.[4] ............ H04R 17/00; H04R 11/00
[52] U.S. Cl. .................. 367/180; 367/188; 310/329; 310/800; 181/122
[58] Field of Search ............ 310/322, 329, 334, 337, 310/338, 800; 73/649, 650, 651, 652; 367/165, 178, 180, 182, 183, 184, 188; 181/122

[56] References Cited

U.S. PATENT DOCUMENTS

| | | | |
|---|---|---|---|
| 3,360,772 | 12/1967 | Massa | 367/157 |
| 4,315,433 | 2/1982 | Edelman et al. | 367/157 |
| 4,333,029 | 6/1982 | Kolm et al. | 367/157 |
| 4,607,145 | 8/1986 | Ravinet et al. | 179/110 A |

FOREIGN PATENT DOCUMENTS

| | | | |
|---|---|---|---|
| 2535060 | 4/1984 | France | 310/329 |
| 59102231 | 4/1986 | Japan | 310/329 |
| 2055018 | 2/1981 | United Kingdom . | |
| 2170008 | 7/1986 | United Kingdom . | |

OTHER PUBLICATIONS

*IEEE Transactions on Industrial Electronics*, vol. 1E-30, No. 1, Feb. 1983, "Development of Low-Cost Multi-function Sensors for Lightweight Fire and Forget Anti-tank Weapon System", Hunter et al, pp. 1-6.

Primary Examiner—Brian S. Steinberger
Attorney, Agent, or Firm—Oblon, Spivak, McClelland, Maier & Neustadt

[57] ABSTRACT

A geophone designed to measure the vibrations of bodies, especially vibrations in the earth's crust, comprises two-strip sensors made of piezoelectric polymer, embedded by one end in the geophone casing and resting freely, by one side, on the inertial mass of the geophone, thus enabling the making of geophones with a very wide pass-band.

6 Claims, 2 Drawing Sheets

FIG_1
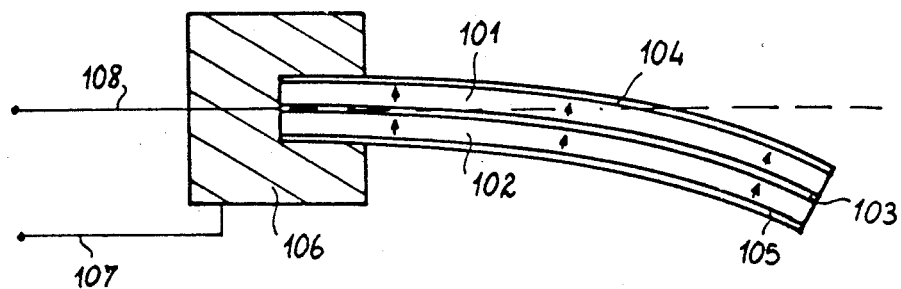
FIG_2
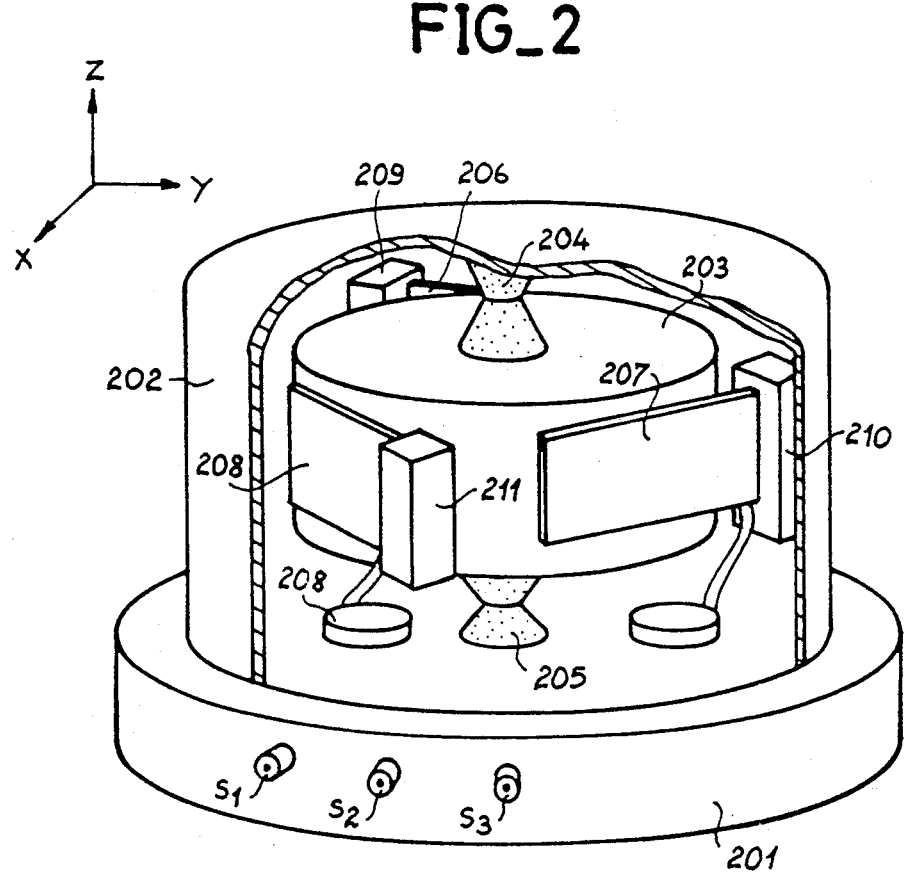

FIG_3
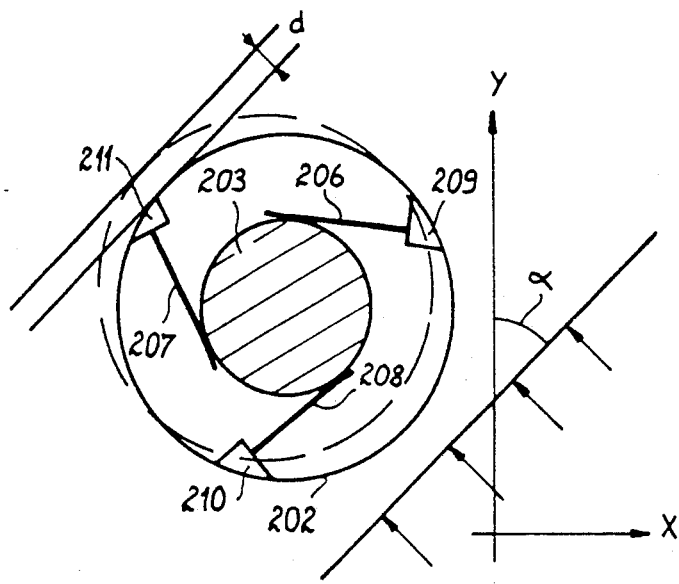
FIG_4
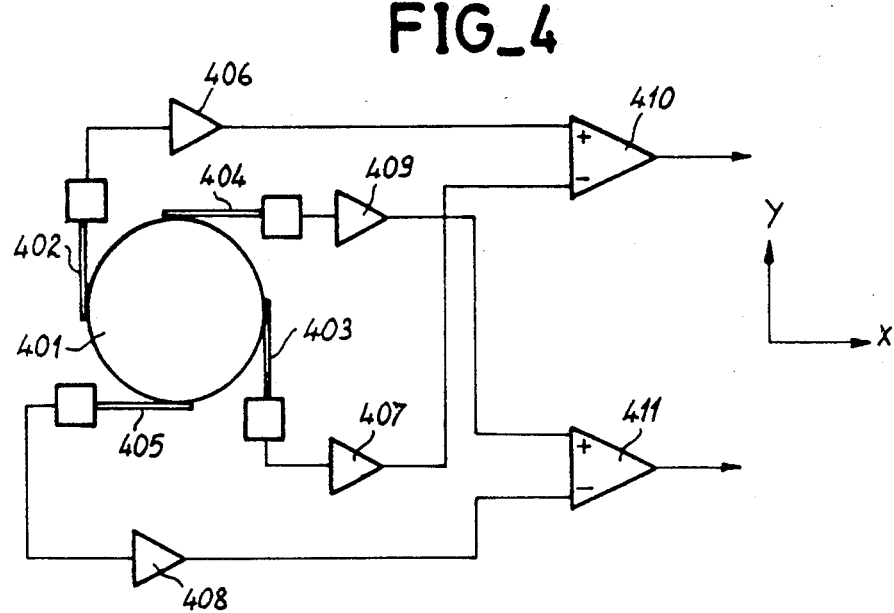

GEOPHONE WITH A SENSITIVE ELEMENT MADE OF PIEZOELECTRIC POLYMER

BACKGROUND OF THE INVENTION

1. Field of the Invention

The present invention relates to geophones, namely devices which can be used to detect sonic or infrasonic vibrations, especially from the earth's crust. It relates more particularly to geophones with a sensitive element made of a piezoelectric polymer.

2. Description of the Prior Art

According to a known method, for example one described in the U.S. Pat. No. 4,144,520, a geophone is made by using a permanent magnet forming an inertial mass, suspended in a casing, which is itself in contact with the medium subjected to the vibrations that have to be detected, which is most usually the ground. A solenoid coil is wound around the casing in such a way that the movements of the magnet within the casing induce electric voltage in this solenoid coil. These movements are due to the inertia of the magnet which remains subtantially still when the casing vibrates through the movement of the ground because of an earthquake for example.

There are known polymer or copolymer materials which, when suitably processed, display piezoelectric properties. The most widely known material is polyvinylidene fluoride, abbreviated as $PVF_2$.

A known method uses a two-strip sensor, such as the one shown in FIG. 1, using two superimposed strips 101 and 102, separated by a conducting electrode 103. These strips are polarized in the same direction, and their external surfaces are covered with conducting electrodes 104 and 105. This two-strip sensor is embedded in a part 106 which, in this case, also provides for connection with the external electrodes 104 and 105, and with an output connection 107. The central electrode 103 is itself joined to a second output connection 108.

When this two-strip sensor is subjected, as in the figure, to a movement of deflection with respect to the embedding part 106, an electrical signal appears between the connections 107 and 108, and this electrical signal increases with the deflection of the two-strip sensor.

An alternative embodiment consists in using two layers of $PVF_2$, polarized in opposite directions, and in picking up the output signal between the external electrodes.

There are also known methods of making piezoelectric polymer based microphone sensors, as described for example in the French Pat. No. 2 542 552 by the Applicant. It is certain that, by fixing a microphone of this type to the ground, a small signal, due to the movement of the ground, is obtained on the microphone. However, the sensitivity of a system of this type is quite poor because there is no inertial mass, and the resonance frequency is far too high to enable the accurate detection of infrasonic vibrations.

SUMMARY OF THE INVENTION

To obtain a geophone comprising a sensitive element made of a piezoelectric polymer, the invention proposes the use of an inertial mass, suspended very freely in a casing, and further proposes providing this casing with at least one two-strip sensor, made of a piezoelectric polymer, said sensor being embedded in one side of the casing and freely resting, by one of its sides, on the inertial mass.

BRIEF DESCRIPTION OF THE DRAWINGS

Other specific features and advantages of the invention will appear more clearly from the following description, made with reference to the appended drawings, of which:

FIG. 1 shows a cross-section view of a prior art piezoelectric polymer two-strip sensor;

FIG. 2 shows a cut-away view of a geophone according to the invention;

FIG. 3 is an explanatory diagram of the operation of the geophone of FIG. 2; and FIG. 4 is a diagram of an alternative embodiment of the geophone of FIG. 2.

DESCRIPTION OF THE PREFERRED EMBODIMENT

The geophone shown in FIG. 2 has a base 201, defining a horizontal plane XY.

A hood 202, which has been cut out in the figure in order to show the inside of the geophone, covers the upper surface of the base and demarcates an internal space in which the main elements of the geophone are placed. This hood, along with the base, forms the casing of the geophone.

A cylinder-shaped inertial mass 203, the axis of which is vertical in a direction Z, perpendicular to XY, is suspended inside the hood 202 by elastic fixing means 204 and 205. In the example shown, these fixing means have a twin-wheel shape, and are made of a viscoelastic material with a low modulus of transverse elasticity. One of them rests on the upper side of the inertial mass and on the internal, upper end of the hood, while the other rests on the lower side of the inertial mass and on the base 201.

There are known materials of this type, gels for example, which enable the vertical suspension of the inertial mass while showing almost no resistance to the movement of this mass in the plane XY, i.e. materials that show very high compliance.

In an alternative embodiment, balls, or even very flexible springs, may be used between the inertial mass, the base and the hood.

Three two-strip sensors, 206 to 208, made of piezoelectric polymer, embedded at one of their ends in embedding parts 209 to 211, are each fixed by their respective embedding parts, evenly at 120° to one another, on the internal vertical side of the hood 202. These two-strip sensors rest, by one side, on three generatrices, which are themselves distributed, at 120° with respect to one another, on the lateral side of this mass. They thus keep the said inertial mass centered in the middle of the hood, without any particular force.

As an alternative, the embedding elements may form part of the hood 202, and will be made during the machining of this hood.

To obtain an accurate response, the two-strip sensors should be perfectly embedded in their supporting parts, and these supporting parts should be perfectly held on the hood in such a way that the derivative of the elastic line during the deflection of the two-strip sensors, which corresponds to the deformation function of these strips, is zero at the embedding point.

In its movement in the plane XY, the mass tends to approach certain two-strip sensors, deforming them, and thus, at the same time, tends to move away from the other two-strip sensors. It is absolutely necessary that the two-strip sensors should always stay in contact with the inertial mass. For this purpose, they are positioned to obtain a prestress such that, when the inertial mass moves away from a two-strip sensor, it reduces this prestress, and such that the two-strip sensor tends to follow the mass, becoming straight again and keeping contact with the surface of the mass.

The outputs of each two-strip sensor are connected to charge amplifiers such as 208. These amplifiers consist, in a known way, of an operational amplifier which is looped with a capacitor in parallel with a resistor so that the amplification is determined essentially by the ratio between this capacitor and the capacitance of the two-strip sensor. The signals of these charge amplifiers, which are advantageously placed inside the hood, are available at the outputs $S_1$ to $S_3$, fixed to the base 201.

The signal delivered by a two-strip sensor depends on the amplitude of the movement of the inertial mass in a direction perpendicular to the surface of this mass, along the generatrix of contact with the two-strip sensor. Since these two-strip sensors are evenly distributed, at 120° with respect to one another, on the periphery of the cylinder, and since their positions in the plane XY are known, the three signals thus obtained enable the complete determining, by a known processing operation, of the relative movement of the inertial mass with respect to the casing. In a simple example, shown in FIG. 3, a plane wave, forming an angle o with the direction Y, causes the casing 202 to move between two positions, one of which is shown with a solid line and the other with broken lines. This movement has a maximum value d in a direction perpendicular to the wave front.

The flexibility of $PVF_2$ enables the making of two-strip sensors with a very low natural resonance frequency, for example lower than 1 Hz for a two-strip sensor that is 35 mm. long and 0.5 mm. thick.

Thus, the response of the geophone is determined essentially by the characteristics of the inertial mass and by its viscoelastic suspension. By the fact that this geophone is used above the resonance frequency of the suspended inertial mass, the mass acts as a sensor of movement in a frequency band which is limited at the lower end by the resonance frequency and, at the higher end, by the decrease in the amplitude of the output signal. As a matter of fact, this signal decreases evenly as a function of the frequency. Depending on the characteristics o the suspension means used, it is possible to obtain a frequency band, which can reach three times a value raised to the 10th power, between 1 Hz and 1 kHz.

There is an entire range of viscoelastic materials which can be used to make a twin-wheel shaped suspension as in FIG. 2, and to adjust the resonance frequency between 1 Hz and 100 Hz.

One alternative embodiment, shown schematically in FIG. 4, uses an inertial mass 401 and four two-strip sensors 402 to 405, evenly distributed around the inertial mass at 90° with respect to one another. There are thus two pairs of two-strip sensors, 402, 403 and 404, 405 respectively, wherein the two-strip sensors of one and the same pair are diametrically opposite to each other, the pairs themselves being mutually perpendicular.

After amplfiication by the charge amplifiers 406 to 409, the signals of the two-strip sensors are applied to differential amplifiers 410 and 411. The signals of one and the same pair are respectively applied to the + and − inputs of one and the same amplifier and, in view of the positioning of the two-strip sensors, this corresponds to a summation of these signals.

The output signals of these differential amplifiers therefore directly give the amplitude and phase of the movement of the inertial mass along the two directions X and Y. The subsequent processing of these signals is thus simplified at the cost, however, of a small degree of complexity in mechanical construction since the system thus obtained is hyperstatic and since the centering of the set has to be more precise.

It is to be noted that the charge amplifiers can be incorporated in differential amplifiers.

The invention can also be extended to a triaxial geophone having an inertial mass, for example a spherical inertial mass, and at least four two-strip sensors resting on this spherical mass, for example at the four corners of a regular tetrahedron.

What is claimed is:

1. A geophone having a measuring plane, which comprises a casing having an internal face, a cylindrical inertials mass having an axis perpendicular to said measuring plane, two end surfaces and a lateral surface, two members made with a viscoelastic material presenting a modulus of transverse elasticity and being fixed to said internal face and to respectively said end surfaces for maintaining said inertial mass along said axis within said casing, and at least three two-strip sensors made of flexible piezoelectric polymer having a low natural resonance frequency, said sensors having two ends, being evenly distributed around said lateral surface resting freeing on said lateral surface and being embedded in said internal face by a single one of said ends, and wherein said members are twin-wheel shaped.

2. A geophone according to claim 1, wherein said viscoelastic material is a gel.

3. A geophone according to claim 1, wherein said three sensors are located at 120° with respect to one another.

4. A geophone according to claim 1, which comprises a fourth two-strip sensor and wherein said sensors are located at 90° with respect to one another.

5. A geophone according to claim 1, wherein the resonant frequency of said geophere range from one $H_z$ to one $KH_z$.

6. A geophone according to claim 5, wherein said resonant frequency ranges from one $H_z$ to one hundred $H_z$.

* * * * *